US011122139B2

(12) United States Patent
Coster et al.

(10) Patent No.: US 11,122,139 B2
(45) Date of Patent: Sep. 14, 2021

(54) SYSTEMS AND METHODS FOR REDUCING DOWNLOAD REQUIREMENTS

(71) Applicant: GOOGLE LLC, Mountain View, CA (US)

(72) Inventors: William Coster, Mountain View, CA (US); Anurag Agrawal, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 50 days.

(21) Appl. No.: 16/346,835

(22) PCT Filed: Nov. 2, 2016

(86) PCT No.: PCT/US2016/060170
§ 371 (c)(1),
(2) Date: May 1, 2019

(87) PCT Pub. No.: WO2018/084840
PCT Pub. Date: May 11, 2018

(65) Prior Publication Data

US 2020/0059531 A1 Feb. 20, 2020

(51) Int. Cl.
*H04L 29/08* (2006.01)
*H04L 29/06* (2006.01)

(52) U.S. Cl.
CPC .......... *H04L 67/2847* (2013.01); *H04L 67/06* (2013.01); *H04L 67/22* (2013.01); *H04L 67/42* (2013.01)

(58) Field of Classification Search
CPC ....... G06F 8/61; G06F 9/44521; H04L 67/06; H04L 67/22; H04L 67/2847; H04L 67/42
See application file for complete search history.

(56) References Cited

U.S. PATENT DOCUMENTS 8,467,773 B1 * 6/2013 Soelberg ................ H04W 4/16 455/414.1
9,137,125 B1 * 9/2015 Doronichev .......... H04L 12/189
2003/0102190 A1 * 6/2003 Newville ................ B66B 3/008 187/391

(Continued)

OTHER PUBLICATIONS

Examination Report for EP Appln. Ser. No. 16805923.6 dated Jul. 6, 2020 (5 pages).

(Continued)

*Primary Examiner* — Gil H. Lee
(74) *Attorney, Agent, or Firm* — Marshall, Gerstein & Borun LLP

(57) ABSTRACT

A method of reducing download requirements for display of content includes transmitting, by a client device to a content server, a content request, the request including an identifier for each of one or more pre-cached media files stored on the client device, the transmission being carried out whilst the client device is connected to a first network. The method further includes receiving, by the client device from the content server, a response comprising instructions to display a selected one of the pre-cached media files, the response including additional display instructions for display of the selected pre-cached media file, and displaying, by the client device, the pre-cached media file according to the additional display instructions.

19 Claims, 5 Drawing Sheets

(56) References Cited

U.S. PATENT DOCUMENTS

| | | | | |
|---|---|---|---|---|
| 2007/0112973 | A1* | 5/2007 | Harris | H04L 67/2842 709/232 |
| 2010/0250341 | A1* | 9/2010 | Hauser | H04L 67/22 707/769 |
| 2015/0215816 | A1* | 7/2015 | Abou-Elkheir | H04L 67/2847 370/230 |
| 2016/0191650 | A1* | 6/2016 | Rong | H04L 67/306 709/213 |
| 2016/0241913 | A1* | 8/2016 | Bhandari | H04L 65/80 |
| 2016/0381176 | A1* | 12/2016 | Cherubini | H04L 67/1097 709/219 |

OTHER PUBLICATIONS

International Preliminary Report on Patentability for PCT Appln. Ser. No. PCT/US2016/060170 dated May 7, 2019 (10 pages).

International Search Report and Written Opinion for PCT Appln. Ser. No. PCT/US2016/060170 dated Jul. 28, 2017 (16 pages).

* cited by examiner

SYSTEMS AND METHODS FOR REDUCING DOWNLOAD REQUIREMENTS

CROSS-REFERENCE TO RELATED APPLICATIONS

This application is a National Stage Application under 35 U.S.C. § 371 of International Patent Application No. PCT/US2016/060170, filed Nov. 2, 2016, entitled "SYSTEMS AND METHODS FOR REDUCING DOWNLOAD REQUIREMENTS," the entirety of which is incorporated by reference herein.

BACKGROUND

An application on a client device can initiate a content display process that involves requesting content from a remote server via a network. The client device can receive a response to the request including a media file. Downloading the response over the network can use significant network resources, such as bandwidth.

SUMMARY

To reduce required bandwidth usage, a client device can pre-cache a media file for display while connected to a network well-suited for handling a large amount of data traffic, such as an Ethernet-based Local Area Network (LAN). Subsequently, at a time of a content display process while connected to a network less suited for handling a large amount of data traffic, such as a satellite network, instructions to display the pre-cached media file and additional display instructions can be downloaded, and the pre-cached media file can be displayed. This allows for, among other things, displaying media files without needing to download the media file itself over a network less suited for handling a large amount of data traffic. This also allows for downloading "fresh" additional display instructions at the time of the content display process, which can help ensure that the media file is displayed according to additional display instructions that have not expired.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1A:
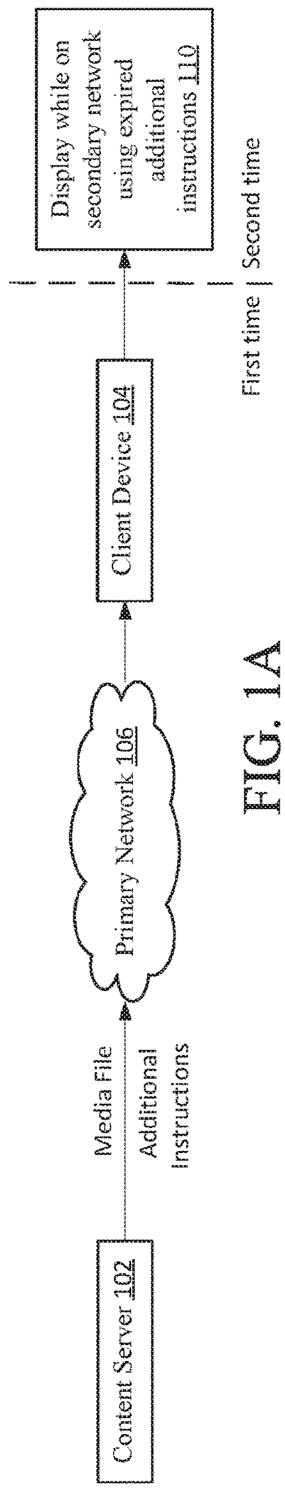
FIG. 1A depicts some implementations of a first method for downloading and displaying content.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

Following below are more detailed descriptions of various concepts related to, and implementations of, methods, apparatuses, and systems for reducing download requirements. The various concepts introduced above and discussed in greater detail below may be implemented in any of numerous ways as the described concepts are not limited to any particular manner of implementation. Examples of specific implementations and applications are provided primarily for illustrative purposes.

The present application is generally directed to systems and methods for reducing download requirements. A client device downloading a media file subsequent to initiating a display process can consume significant network resources over a short period of time. This may be disadvantageous, for example, for client devices that have limits on how much data can be downloaded while connected to the network. For example, some client devices are associated with data plans (such as an agreement with a network provider) that provide for downloading a limited amount of data over a cellular connection over a given period of time. Downloading a media file over the cellular network can consume a significant portion of this data allotment. Furthermore, if a number of client devices download media files over a cellular network at a same time, the network's resources may be strained or may be unable to handle the demand.

Some networks may be better suited to handling a large amount of data traffic than others. For example, a high bandwidth Wi-Fi, Bluetooth, Near Field Communication (NFC), wireless Universal Serial Bus (USB), wired USB, or (LAN) can be better suited for handling a large amount of data traffic than a cellular or satellite network. Furthermore, some client devices can be associated with data plans that allow for unlimited downloading over the high bandwidth connection, or allow for a larger data limit than is allowed for downloading over a cellular or satellite connection.

As used herein, the term "primary network" is used to refer to a network that is associated with favorable download conditions, such as a network for which a client device has an unlimited or large data plan, or a network well-suited to handling a large amount of data traffic. For example, in some cases, a high bandwidth Wi-Fi, Bluetooth, NFC, Wireless USB, Wired USB, or Ethernet-based LAN network can be a primary network. The term "secondary network" can refer to a network for which a client device has a relatively smaller or more expensive data plan, or a network less well-suited to handling a large amount of data traffic than is the case for a primary network. For example, in some cases, a cellular or satellite network can be a secondary network. In other cases, a first cellular network may be a primary network, such as a domestic network with a low cost or high limit data plan; and a second cellular network may be a secondary network, such as a foreign network with a high cost or low limit "roaming" data plan.

By downloading a media file over a primary network, a client device can make more efficient use of computer and network resources than by downloading the media file over a secondary network. This efficient use of computer or network resources can be implemented, for example, during a content display process executed by the client device. The client device may download and store or pre-cache one or more media files while connected to a primary network, and at a later time, while connected to a secondary network, the client device can initiate a content display process that displays the pre-cached media file. This can be more efficient than the client device initiating a content display process while connected to a secondary network and subsequently downloading the media file.

However, there can be problems associated with pre-caching many or all of the files required for the content display process. For example, the content display process can include receiving, from a remote server, display instructions that instruct an application of the client device to display a downloaded media file, and can further include receiving, from a remote server, additional display instructions. The additional display instructions can include, for example, Hypertext Markup Language (HTML) data, cascading style sheets (CSS) data, and/or statistical tracking information. HTML data or CSS data can be used, for example, to identify or determine or generate a context in which the media file is displayed. For example, the HTML data or CSS data can describe or define one or more characteristics of a window in which the media file is displayed. The statistical tracking information can be used to track information related to the provision, storage, execution, accessing, displaying, or viewing the media file or metadata related to the media file. For example, the statistical tracking information can include any of a URL or web address for a statistics tracking website that tracks or counts views or visits of the website or that can receive and store data from a website viewer or visitor. This can be used to track information related to display of the media file, such as whether the media file was displayed. The additional display instructions are described in more detail below in reference to FIG. 2.

In some cases, the additional display instructions may expire after some time has passed. For example, a website specified by a statistics tracking URL may only be valid (e.g. may only be maintained and/or monitored by, for example, a measurement server) for a predetermined amount of time subsequent to download of the statistics tracking URL. Thus, it may be advantageous to execute a content display process using a "fresh" statistics tracking URL that has not yet expired.

In some cases, HTML or CSS data may be disseminated to client devices based on a research or measurement plan, such as a research plan that attempts to determine whether and how a manner of display of content affects a user experience. For example, the HTML or CSS data may include instructions to play a media file on the display 216 in a borderless window, or alternatively in a thick bordered window. The research plan may be best implemented by testing these alternatives in specific time frames. For at least that reason, it may be advantageous to play a media file on the display 216 according to "fresh" HTML or CSS data (e.g. displaying the content according to the HTML or CSS data within time frames specified by a research plan).

If additional display instructions are pre-cached along with the media file, there is a risk that the additional display instructions will have expired by the time the media file is displayed. Moreover, the additional display instructions, whilst comprising a smaller amount of data than the media file, will nevertheless take up space in the device memory, which can be problematic where space in the device memory is at a premium.

Furthermore, in some cases, a content server may select a media file for display on a client device based on a variety of factors, such as a content-type preference associated with the user device or a number of times a media file has previously been displayed on the client device. If a media file is so selected by a content server and then is pre-cached on a client device such that it will automatically be displayed at a next content presentation opportunity, the media file may, in some cases, only be displayed after a significant period of time has passed. It may be better to select the media file for display at or near a time of display such that the selection is based on up-to-date "fresh" factors.

Some implementations of this disclosure provide for methods and systems that can solve the technical problems of downloading large data files over a suitable network connection and using fresh additional display instructions and fresh factors in making a selection of a media file to display. Some methods and systems described herein can solve these problems by, for example, including a client device pre-caching a media file while on a primary connection, and at a later time executing a content display process including selecting the pre-cached media file for display based on fresh selection factors and downloading the additional display instructions. By pre-caching the media file, network and computational resources can be used efficiently, and by downloading the additional display instructions while on a secondary connection, the content display process can be executed using fresh additional display instructions. In addition, downloading the additional display instructions at or near the time the content is to be displayed, rather than pre-caching those additional display instructions together with the media file(s), can help to reduce the demand for storage space in the device memory.

Figure 1B:
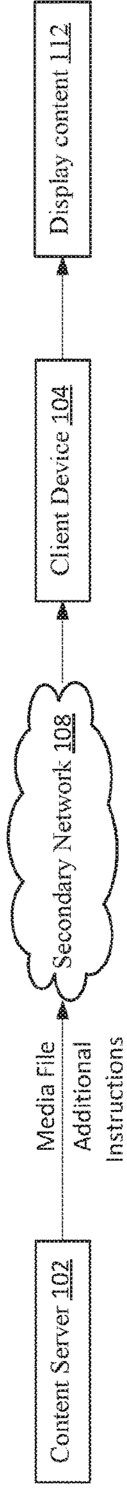
FIG. 1B depicts some other implementations of the first method for downloading and displaying content.
Figure 1C:
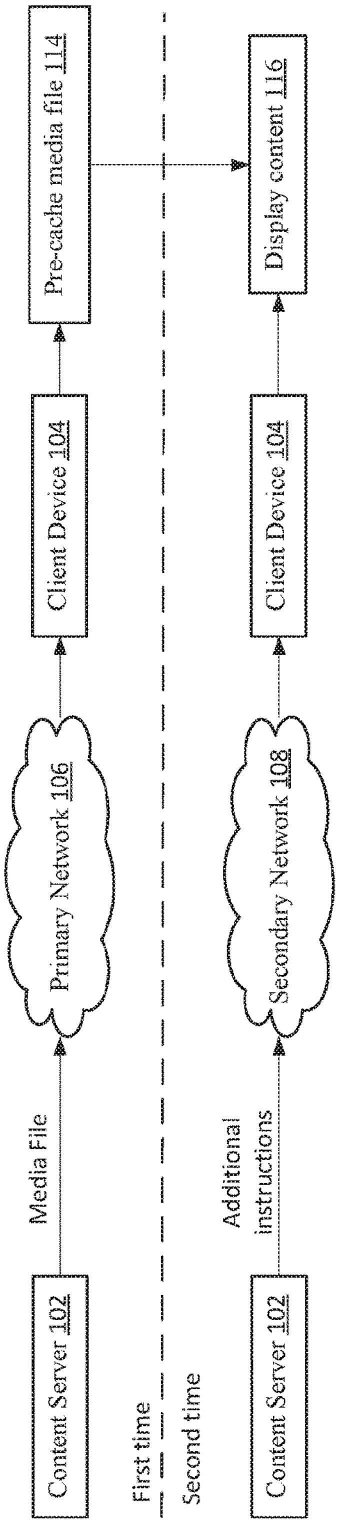
FIG. 1C depicts some implementations of an efficient second method for downloading and displaying content.

FIGS. 1A through 1C depict various methods of retrieving and displaying content on a client device. FIG. 1A shows some implementations of a method in which a client device 104 downloads a media file and additional instructions over a primary network 106 from a content server 102, and at a later time displays the media file. FIG. 1B shows some implementations of a method in which the client device 104 downloads the media file over a secondary network 108 from a content server 102 and displays the media file. FIG. 1C shows some implementations of a method in accordance with some implementations of this description, in which the client device 104 downloads the media file over the primary network 106 from the content server 102 and pre-caches the media file, and later downloads additional instructions over the secondary network 108 from the content server 102 and displays the content in accordance with the fresh additional instructions.

Referring now to FIG. 1A in more detail, FIG. 1A illustrates the problem discussed above of displaying content using expired additional instructions. In the implementations shown, the client device 104 downloads the additional instructions along with the media file at a first time over the primary network 106, and at a later second time, such as at a time after which a predetermined amount of time has passed, or a time at which a statistics tracking website associated with the additional instructions is no longer maintained (e.g. a time at which the additional instructions have expired), display of the media file is performed based on the expired additional instructions. In these implementations, although data is downloaded efficiently using the primary network 106, selection criteria for selection of the media file may be expired or stale, and statistical tracking data is not properly recorded. In addition, the client device 104 is forced to store the additional instructions in memory from the time at which the media file is downloaded at least until the time the media file is displayed, thereby increasing demand for storage space in the device memory.

Referring now to FIG. 1B in more detail, FIG. 1B illustrates the problem discussed above of downloading a media file over a secondary network 108. In the implementations shown, the client device 104 downloads a media file and additional display instructions over the secondary network and displays the media file at a time, for example, at which the additional display instructions are still fresh. While the statistical tracking process will still work properly in these implementations, unlike in the implementations depicted in FIG. 1A, in these implementations a large portion of a data allotment to the client device 104 under a data plan associated with the secondary network 108 will be consumed.

Referring now to FIG. 1C in more detail, FIG. 1C illustrates some implementations of a method in accordance with some implementations of this description. FIG. 1C shows a client device 104 downloading a media file at a first time over the primary network 106. In this way, the client device makes efficient use of the primary network 106, which as discussed above may be better suited for downloading large files than the secondary network 108. Subsequent to downloading the media file, the client device 104 may pre-cache the media file. The pre-caching can be performed prior to, in parallel with, or subsequent to an initial display of the media file, making it available for further display. FIG. 1C also shows the client device 104 downloading the additional instructions over the secondary network 108 at a second time. The client device 104 can then display the pre-cached media file based on the freshly downloaded additional instructions. In this manner, a method of reducing download requirements for the display of the media file can be performed. The primary network 106 was efficiently used to download the large media file, and the secondary network was used at a second time to download fresh additional instructions such that, for example, a statistics tracking process can be performed. Since the additional instructions are downloaded at or near the time the content is due to be displayed, rather than being downloaded together with the media file, the requirement to store the additional instructions in memory for a prolonged time is avoided, so helping to reduce the demand for storage space in the device memory.

Figure 2:
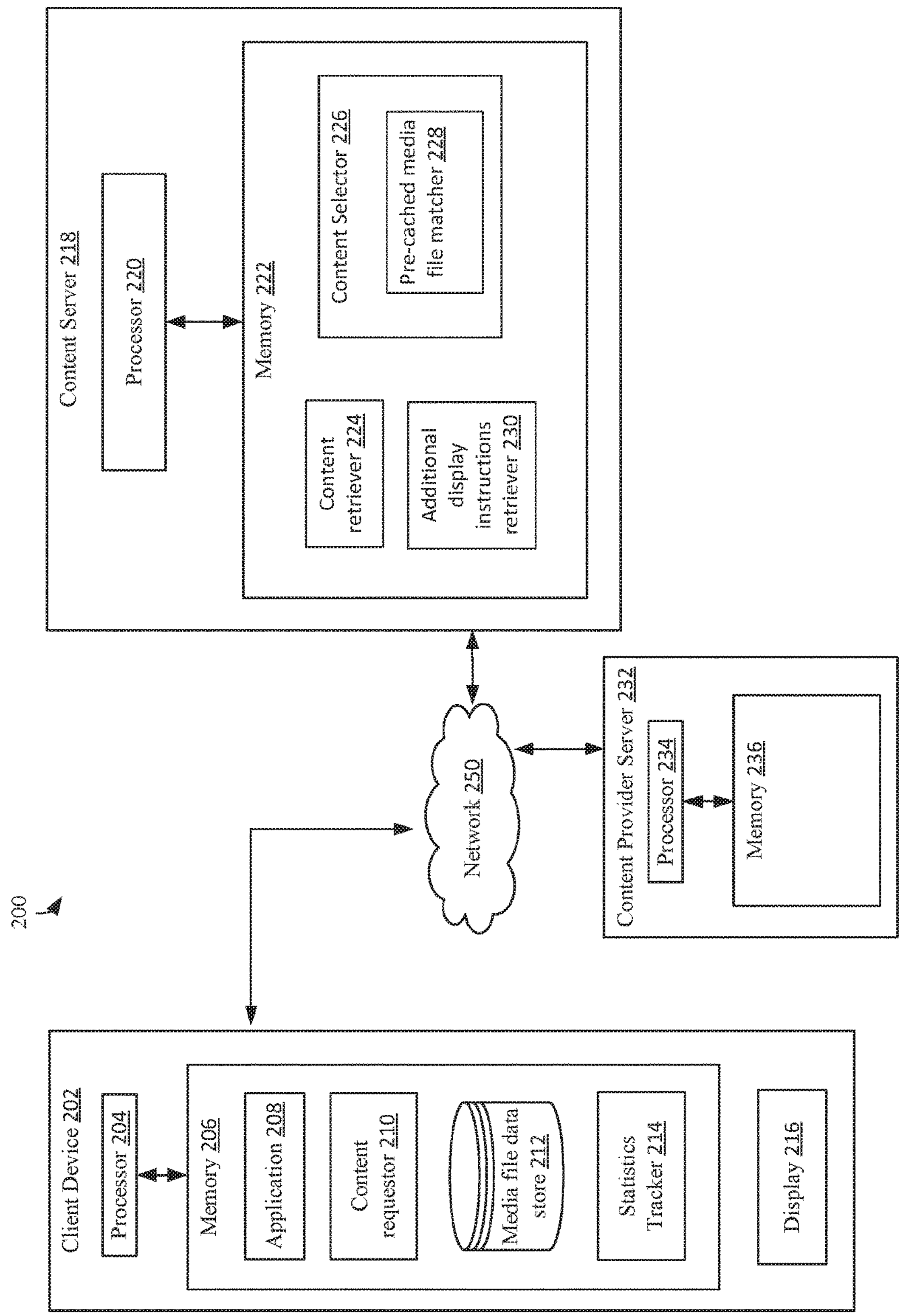
FIG. 2 is a block diagram depicting some implementations of a system for reducing download requirements.

FIG. 2 is a block diagram depicting an implementation of a system 200 for reducing download requirements using pre-caching. The system 200 may comprise one or more client devices 202 (which may be referred to herein as "the client device 202"), a content server 218, and a content provider server 232, each of which can communicate with one another via one or more networks, such as the network 250. In some implementations, the network 250 may include a LAN network, a Wi-Fi network, a cellular network, a wide area network (WAN), a telephone network, such as the Public Switched Telephone Network (PSTN), a wireless link, a satellite link, a device-to-device mesh network, an intranet, the Internet, or combinations thereof Referring to the client device 202 in more detail, in some implementations, the client device 202 can be similar to the client device 104 depicted in FIGS. 1A-1C. The client device can include a display 216. The client device 202 can include one or more data processors 204 configured to execute instructions stored in a memory 206 to perform one or more operations described herein. The memory 206 may be one or more memory devices. In some implementations, the processor 204 and the memory 206 of the client device 202 may form a processing module. The processor 204 may include a microprocessor, an application-specific integrated circuit (ASIC), a field-programmable gate array (FPGA), etc., or combinations thereof. The memory 206 may include, but is not limited to, electronic, optical, magnetic, or any other storage or transmission device capable of providing processor with program instructions. The memory 206 may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, C, C++, C#, Java®, JavaScript®, Perl®, HTML, XML, Python®, and Visual Basic®. The processor 204 may process instructions and output data to effect presentation of one or more media files on the client device 202.

In some implementations, the client device 202 may include one or more applications, services, routines, servers, daemons, or other executable logics for executing applications and for requesting and displaying media files. These applications, services, routines, servers, daemons, or other executable logics may be integrated such that they may communicate with one another or be enabled to make calls to routines of each other. In some implementations, these applications, services, routines, servers, daemons, or other executable logics may include an application 208, a content requestor 210, a media file data store 212, and a statistics tracker 214.

In some implementations, the application 208 can include one or more applications, including an application configured to initiate a content display process. For example, the application 208 can include a web browser application, a game application, a map application, video display application, a product or services or business review application, or any other application that can initiate a content display process. Application 208 may be variously referred to as an application, client application, client agent, caching agent, or by any other such name.

In some implementations, the application 208 can initiate a content display process by commanding the content requestor 210 to request content from, for example, a remote server such as the content server 218. The application 208 can initiate a content display process based on user input, such as user input via a keyboard (digital or analog), mouse, pointer, stylus, touch screen, other touch component, or any other input device. For example, the application 208 can cause buttons or links to be displayed on the display 216, and can initiate a content display process responsive to the user clicking or otherwise selected one of the buttons or links. In some implementations, the application 208 can initiate a content display process based on, for example, a schedule for initiating content display. For example, the application 208 can initiate a content display process based on a predetermined amount of time having passed since the application was executed, or since a process of the application was executed, or based on a process of the application having been executed a predetermined number of times. The application 208 can initiate a content display process based on, for example, a primary content being displayed by the application for a predetermined amount of time. For example, the application 208 can be a video display application that, when executed, can display primary content, such as primary content selected by a user. The application 208 can display primary content, and can initiate a content display process after the primary content has been shown for a predetermined amount of time. The predetermined amount of time can be based on a total playtime of the primary content, or can be a fixed amount of time. In some implementations, the application 208 can initiate a content display process prior to a display of primary content, for example, immediately prior to the display of primary content, or can initiate a content display process following display of at least a portion of primary content.

In some implementations, the application 208 can play a media file on the display 216 as part of the content display process. The application 208 can play a media file on the display 216 based on display instructions and/or additional display instructions received from the content server 218 in response to a content request. The content request can be understood to be a communication sent from the client device 202 to the content server 218, indicating the need or desire to display content on the content device 202, and on the basis of which the content server 218 may provide or select suitable content, such as a particular media file, for the client device 202 to display. For example, the content server 218 may respond to the content request by providing a media file for download by the client device 202, or by specifying a media file stored on the client device to display. In some implementations, based on an identification of a selected media file included in the display instructions and/or the additional display instructions, the application 208 can display a pre-cached media file stored in the media file data store 212. In some implementations, the application 208 can display a media file upon downloading the media file from the content server 218.

In some implementations, the content requestor 210 can include one or more applications, services, routines, servers, daemons, or other executable logics for requesting content and/or for executing a content display process. The content requestor 210 can execute a content display process responsive to the application 208 initiating a content display process.

In some implementations, the content requestor 210 can determine a network connection type. For example, the content requestor 210 can query a network interface (not shown) of the client device 202 to determine a network connection type. The network interface can include one or more applications or other executable logics for receiving data via the network 250 and for transmitting data from the client device 202 to any of the other devices connected to the network 250. A network connection type can be, for example, a primary network connection, such as a high-bandwidth Wi-Fi connection or an Ethernet-based LAN connection, or the network connection type can be, for example, a secondary network connection, such as a cellular or satellite connection.

In some implementations, responsive to determining that the network connection is a primary network connection, the content requestor 210 can continue to implement the content display process as a primary content display process. This can be, for example, a process that may have more intensive download requirements than a secondary content display process. The primary content display process may involve downloading a large amount of data relative to the secondary content display process, including, for example, a media file. The content requestor 210 executing the primary content display process can include the content requestor 210 transmitting a content request to the content server 218. The request can include content request information related the display of the content. For example, the content request information can include a range of acceptable playtimes of the content, a parameter indicating whether the content may include a skip option, a parameter indicating whether the content can be auto-play content, or other parameters including playback orientation, resolution, duration, or any other parameters. In some implementations, the content request information can include an identifier of pre-cached media files stored in the media file data store 212.

In some implementations, the primary display process can include the client device receiving a response to the content request from, for example, the content server 218. The content requestor 210 can receive a response to the content request that includes display instructions. Display instructions can include, for example, a request for the client device 202 to play a media file on a display, such as the display 216, and/or for the application 208 to display the content in a user interface or display window of the application 208. The response to the content request can include additional display instructions. The additional display instructions can include, for example, HTML data, CSS data, an auto-play instruction, and/or statistical tracking information.

In some implementations, HTML data or CSS data can be used, for example, to identify or determine or generate a context in which the media file is to be played. For example, the HTML data or CSS data can describe or define one or more characteristics of a window in which the to play the media file. The auto-play instruction can include, for example, an instruction to display the content using auto-play, or to display the content using click-to-play.

In some implementations, the statistical tracking information can be used to track information related to the provision, storage, execution, accessing, displaying, or viewing the media file or metadata related to the media file. For example, the statistical tracking information can include any of a URL or web address for a website that tracks or counts views or visits of the website or that can receive and store data from a website viewer or visitor. This can be used to track information related to display of the media file, such as whether the media file was displayed, a number of times the media file was displayed, a device type on which the media file was displayed, a length of time for which the media file was displayed, whether the media file was watched to completion, a point during display of the media file at which a remainder of the display of the media file was skipped, or any other information related to display of the media file.

In some implementations, the primary content display process can include the client device 202 receiving the media file, the display instructions, and the additional display instructions from the content server 218. As discussed above, the application 208 can display the media file according to the display instructions and according to the additional display instructions. As one example, the display instructions can include instructions to display the media file, and the additional display instructions can include instructions to display the media file automatically, to display the media file in a blue-bordered browser window, and can specify that a statistics-tracking URL is to be accessed and media playback statistics, that can include information related to whether the media file was watched to completion, are to be transmitted or uploaded to the website specified by the URL. The application 208 can, based on the display instructions and the additional display instructions, automatically display the media file on the display 216 in a blue-bordered window, and can transmit a request to the statistics tracker 214 to access the website specified by the statistics-tracking URL and to transmit media playback statistics to the website, such as an indication that the media file was displayed to completion to the website.

In some implementations, the primary content display process can include the content requestor 210 storing or pre-caching the displayed media file in the media file data store 212. The content requestor 210 can flag the pre-cached media file as a media file compatible with a secondary content display process. The content requestor 210 can determine that there is sufficient space in the media file data store 212 prior to pre-caching the media file. In some implementations, the content requestor 210 can pre-cache the media file responsive to determining that a number of stored media files in the media file data store is below a threshold, such as a predetermined threshold. For example, the content requestor 210 may pre-cache the media file responsive to determining that there is less than 5, 10, 15, 20, or another number of media files already stored in the media file data store. In some implementations, the content requestor 210 can pre-cache the media file responsive to determining that an amount of memory used by the media files already stored in the media data store 212 is below a threshold, such as a predetermined threshold.

In some implementations, subsequent to initiating a content display process, and responsive to determining that the network connection is a cellular connection, the content requestor 210 can initiate the secondary content display process. This can be, for example, a process that may have reduced download requirements than the primary download process, and may involve not downloading a media file. The secondary content display process may involve downloading a smaller amount of data relative to the primary content display process, such as downloading display instructions and additional display instructions, but not downloading a media file for display. The content requestor 210 executing the secondary content display process can include the content requestor 210 transmitting a content request to the content server 218. The request can include content request information, such as parameters related to the content to be displayed. The request can further include an identification of media files store in media file data store 212 that are compatible with the secondary display process, such as an individual identifier for each such media file.

In some implementations, the secondary content display process can include the client device 202 receiving the display instructions and the additional display instructions from the content server 218. The display instructions can include instructions to display at least one of the pre-cached media files stored in the media file data store 212. The application 208 can display the at least one pre-cached media file according to the display instructions and according to the additional display instructions. This method allows for the client device 202 to make efficient use of computing and network resources.

In some implementations, the memory 206 can store a statistics tracker 214. The statistics tracker 214 can include one or more applications, services, routines, servers, daemons, or other executable logics for tracking statistics. In some implementations, the statistics tracker 214 can include, for example, a script that, when executed, causes a web browser installed on the client device 202 to access a statistics tracking website specified by a URL, such as a URL specified by additional display instructions received from the content server 218. The statistics tracking website can be maintained by a measurement server. The statistics tracker 214 can further transmit or upload media playback statistics to the statistics tracking website, such as information related to whether and how a media file was displayed, and/or whether and how a user interacted with the media file during display. For example, the media file may include a link to a webpage, and the statistics tracker 214 may transmit to the statistics tracking website information indicating whether and how many times that linked was accessed or clicked by a user to whom the media file was displayed.

In some implementations, the client device 202 includes a display 216. The display 216 can be, for example, a Liquid Crystal Display (LCD), a Thin-Film-Transistor LCD (TFT), a Light Emitting Diode (LED) display, an Organic Light Emitting Diode (OLED) display, Electronic Paper display, Plasma Display Panel (PDP), and/or other display, etc., for displaying information to a user. In some implementations, the display 216 can be a touch display, such as a touch screen configured to receive tactile input and to convert the input to a signal. The display 216 can display, for example, a media file displayed by application 208.

Referring now to the content server 218 in more detail, content server 218 can be similar to the content server 102 depicted in FIGS. 1A-1C. The content server 218 can include one or more data processors 220 configured to execute instructions stored in a memory 222 to perform one or more operations described herein. The memory 222 may be one or more memory devices. In some implementations, the processor 220 and the memory 222 of the client content server 218 may form a processing module. The processor 220 may include a microprocessor, an application-specific integrated circuit (ASIC), a field-programmable gate array (FPGA), etc., or combinations thereof. The memory 222 may include, but is not limited to, electronic, optical, magnetic, or any other storage or transmission device capable of providing processor with program instructions. The memory 222 may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, C, C++, C#, Java®, JavaScript®, Perl®, HTML, XML, Python®, and Visual Basic®.

The memory 222 can include one or more applications, services, routines, servers, daemons, or other executable logics for receiving a content request from the content requestor 210, and/or for selecting and retrieving content for transmission to the client device 202. The memory 222 can include a content retriever 224, a content selector 226, a stored media file matcher 228, and an additional display instructions retriever 230.

In some implementations, the content server 218 can receive a content request from the content requestor 210 via, for example, a network, such as the network 250. The request can include content request information related the display of the content. For example, the content request information can include a range of acceptable playtimes of the content, a parameter indicating whether the content may include a skip option, a parameter indicating whether the content can be auto-play content, a parameter indicating a network connection type (e.g. a parameter indicating if the client device 202 is currently connected to a primary network or a secondary network), or other parameters. In some implementations, the request can include identifiers of one or more pre-cached media files stored in the media file data store 212. Such a request may be received, for example, as part of a secondary content display process. The content server 218 can store any such received identifiers in the memory 222. The content server 218 can, responsive to receiving the request, command the content retriever 224 to retrieve data related to the request.

In some implementations, the content retriever 224 can include one or more applications, services, routines, servers, daemons, or other executable logics retrieving data related to a content request. In some implementations, the content retriever 224 can retrieve the data related to a content request by transmitting a request for one or more identifiers of items of content from one or more remote servers, such as the content provider server 232. The content retriever 224 can request identifiers of items of content that correspond to the content request information. For example, the content retriever 224 can request, from the content provider server 232, identifiers of media files that satisfy an acceptable playtime requirement included in the content request information. Such identifiers may later be used to identify media files already stored on the content server 218 that correspond to the identifiers. In some implementations, the content retriever 224 can request media files themselves, rather than or in addition to identifiers of items of content. This method can be used, for example, when the media files are not already stored on the content server 218, or are not readily accessible to the content server 218.

In some implementations, the content retriever 224 can receive a response to the request for identifiers of items of content or media files from the content provider server 232. The response can include, for example, identifiers of items of content that satisfy one or more requirements included in the content request information, and/or media files that satisfy one or more requirements included in the content request information. The content retriever 234 can identify media files that correspond to the identifiers of items of content, or media files received from the content provider server 232, and can provide those media files or provide a location of those media files to the content selector 226.

In some implementations, the content retriever 224 can receive the response to the request for identifiers of items of content or media files from the content provider server 232 including selection criteria and corresponding monetary agreements provided by the content provider server 232 that can later be used in a selection of the identified media file s by the content selector 226.

In some implementations, the content selector 226 can include one or more applications, services, routines, servers, daemons, or other executable logics for selecting content for display. The content selector 226 may select one or more items of content for display on the client device 202. The selection of items of content for display can be based on, for example, selection criteria and monetary agreements transmitted by the content provider server 232 and received by the content server 218. The content selector 226 can assign selection weight points to a monetary agreement based on, for example, a monetary amount associated with the monetary agreement and/or a correspondence between selection criteria and display of the media file by the client device. The content selector 226 can also assign selection weight points based on other factors, including, for example, preferred content categories associated with the client device, or a number of times the media files has been previously displayed by the client device. One advantage of some implementations described herein is that the assigning of selection weight points may be performed at or near a time of display of a media file, such that factors or conditions based on which the section weight point are assigned are assessed on up-to-date information, as compared to a process that pre-caches a media file on a client device and then simply directly displays the pre-cached media file. The content selector 226 can select a monetary agreement based on the monetary agreement having a highest number of selection points out of a plurality of monetary agreements received from, for example, content provider servers 232, and the content server 218 can then transmit, for example, the media file, an identification of the media file, or additional instructions related to the media file to the client device 202.

The monetary agreements may specify monetary payment amounts that will be paid contingent upon a media file being displayed and/or interacted with by a viewer or user of a client device on which the media file is displayed. Monetary payment amounts may be utilized by the content selector 226 in a process of selecting and/or serving media files for display. For example, the content provider server 232 may assign selection weight points content based on an identification that a publisher will pay a certain amount of money if a user interacts with the content provider server 232's media file (e.g., $3 will be paid if a user clicks on the displayed media file). The content provider server 232 may assign a higher number of selection points to monetary agreements associated with a higher monetary amount. In other examples, the content publisher may agree to pay a certain amount of money if the media file is selected and served (e.g., $0.005 will be paid each time a media file is selected and served).

In some implementations, the content selector 226 can receive different monetary agreements to pay different amounts for display of a media file in different manners. For example, the content selector 226 can receive different agreements associated with playing a media file on a display depending on whether the media file is already pre-cached on the client device 202. In some implementations, an agreement may be associated with a higher monetary amount for playback of a media file on a display if media file is already pre-cached on the client device 202, and a lower monetary amount if the media file is not pre-cached on the client device 202. In some implementations, selection weights points may be added to a monetary agreement based on an associated media file being pre-cached on the device. As another example, an agreement may be associated with a lower payment amount for a click-to-play media file. A click-to-play media file can be, for example, a video media file that will be played responsive to a user selecting a play option (such as by clicking a play button displayed on a user interface provided by the application 208. An agreement for displaying a media file in such a manner can have a low monetary amount compared to, for example, an auto-play media file because the media file may not be displayed if a user refrains from clicking play. By contrast, an agreement may be associated with a higher amount for display of a media file on the client device 202 as an auto-play media file. An auto-play media file can be, for example a media file that is displayed automatically to a user without the user selecting a play option. Such a media file is more likely to be displayed than the click-to-play media file, and a monetary value to serve the media file as an auto-play media file can be higher.

In some implementations, the content selector 226 can determine whether one or more selection criteria would be satisfied by the client device 202. For example, the content selector 226 can receive a monetary agreement associated with a high monetary amount having an auto-play display criterion. In some implementations, the selection criteria can be required criteria, such that the terms of the agreement will not be considered fulfilled unless the selection criteria are satisfied. In some implementations, the selection criteria are preferred criteria. The content selector 226 can assign weight points based on, for example, whether the preferred criteria are satisfied, or based on a degree to which the preferred criteria are satisfied. The content selector 226 can determine, responsive to receiving the monetary agreement associated with the high monetary amount, whether the display of the media file would satisfy the auto-play criterion. In some implementations, the content selector 226 can determine based on the content request information that the content request is compatible with auto-play—for example, the content request information can indicate that auto-play is permissible. In other implementations, the content selector 226 can determine that the auto-play criterion is satisfied indirectly, such as based on an automatic display protocol. For example, the content selector 226 can follow a default protocol that assumes display of the media file will be auto-play when either (i) the media file is pre-cached on the client device 202, or (ii) the client device is connected to a primary network. When the media file is not pre-cached, and the client device is not connected to a primary network, the content selector may assume that auto-play is not permissible. This default protocol can be used to avoid having the client device 202 automatically download the media file when connected to a secondary network, which may be irksome to a user. The content selector 226 can thus indirectly determine whether the auto-play criterion is satisfied by analyzing the content request data to determine whether either of conditions (i) or (ii) are in effect.

In some implementations, the content selector 226 includes a pre-cached media file matcher 228. The pre-cached media file matcher 228 can include one or more applications, services, routines, servers, daemons, or other executable logics for identifying whether a media file or an identifier of a media file received from the content provider server 232 matches a media file stored on the client device 202. The content selector 226 may use the pre-cached media file matcher 228, for example, in selecting a media file to display, and/or in determining whether to assume or determine that auto-play is permissible based on the media file for display being pre-cached on the client device 202.

In some implementations, the content selector 226 includes an additional display retriever 230. The additional display instructions retriever 230 can include one or more applications, services, routines, servers, daemons, or other executable logics for retrieving additional display instructions. Such instructions can include, for example, a URL for a statistics tracking website, or HTML or CSS data indicating or defining a context for display of the media file. The additional display instructions retriever 230 can retrieve additional display instructions from the memory 222, or can generate the additional display instructions. For example, the additional display instructions retriever 230 can receive a statistics tracking website URL from the content provider server 232, and can provide that URL to an application stored in the memory 222 for eventual transmission to the client device 202. Alternatively, the additional display instructions retriever 230 can retrieve a known URL from a plurality of statistics tracking URLs stored in the memory 222, and can provide the URL to an application stored in the memory 222 for eventual transmission to the client device 202. This can be implemented, for example, when the content server 218 maintains or manages the statistics tracking website rather than, or in addition to, the content provider server 232 maintaining or managing the statistics tracking website.

As another example, the additional display instructions retriever 230 can retrieve HTML or CSS data, and can vary or alter the data, or generate new data, according to a research plan. For example, a research plan might call for displaying content in a window having a red border during a first time period, and displaying content in a window having a blue border in a second time period. Information related to the research plan can be stored in the memory 222. The additional display instructions retriever 230 can generate appropriate HTML data based on the research plan and based on a determination of whether a current time falls within the first time period or the second time period, and can provide such information for transmission by the content server 218 to the client device 202.

Referring now to the content provider server 232 in more detail, the content provider server 232 can include one or more data processors 234 configured to execute instructions stored in a memory 236 to perform one or more operations described herein. The memory 236 may be one or more memory devices. In some implementations, the processor 234 and the memory 236 of the content provider server 232 may form a processing module. The processor 234 may include a microprocessor, an application-specific integrated circuit (ASIC), a field-programmable gate array (FPGA), etc., or combinations thereof. The memory 236 may include, but is not limited to, electronic, optical, magnetic, or any other storage or transmission device capable of providing processor with program instructions. The memory 236 may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, C, C++, C#, Java®, JavaScript®, Perl®, HTML, XML, Python®, and Visual Basic®. The memory 236 can include one or more applications, services, routines, servers, daemons, or other executable logics for generating and/or transmitting monetary agreements to place a media file for display.

In some implementations the content provider server 232 can receive from the content server 218 a request to identify content. The content provider server 232 can transmit a response to the request by transmitting to the content server 218 one or more identifiers of media files.

In some implementations, the content provider server 232 can receive from the content server 218 a request to transmit one or more media files. The content provider server 232 can transmit a response to the request by transmitting to the content server 218 one or more media files.

In some implementations, the content provider server 232 can further transmit a response including a monetary agreement and/or rules or protocols for generating monetary agreements. For example, the content provider server 232 can transmit a media file identifier, and two or more associated monetary payment amounts, each monetary payment amount having different criteria, such as, for example, an auto-play criterion or a click-to-play criterion.

Figure 3A:
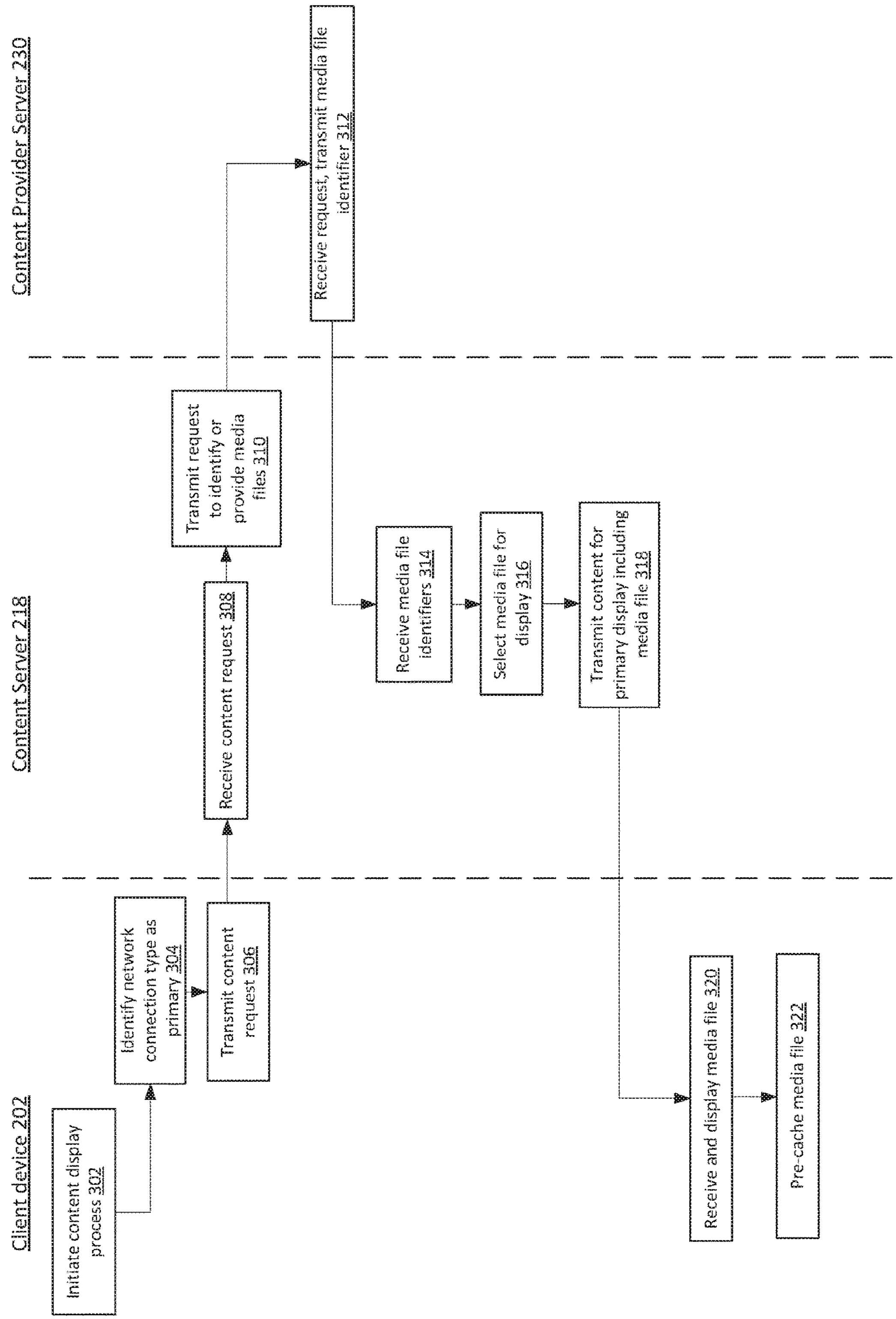
FIG. 3A is a flowchart depicting an implementation of a primary content display process.

FIG. 3A depicts some implementations of a primary content display process 300. As discussed above, the primary content display process can be a process implemented by the client device 202 responsive to the content requestor 210 determining that the client device is connected to a primary network. The primary content display process can include steps 302-322. Generally, at step 302, the application 208 can initiate a content display process. At step 304, the content requestor 210 can identify a network connection type as a primary network connection. At step 306, the content requestor 210 can transmit a content request to the content server 218. At step 308, the content server 218 can receive the content request. At step 310, the content retriever 224 can transmit a request to identify or provide media files to the content provider server 232. At step 312, the content provider server 232 can receive the request, and can respond by transmitting to the content server 218 one or more media file identifiers that correspond to the request. At step 314, the content retriever 224 can receive the one or more media file identifiers. At step 316, the content selector 226 can select a media file for display. At step 318, the content server 218 can transmit the selected media file to the client device 202. At step 320, the client device 202 can receive and play the media file on the display 216. At step 322, the client device 202 can pre-cache the media file.

Referring now to the steps of primary display process 300 in more detail, in some implementations, at step 302, the application 208 can initiate a content display process. The application 208 can initiate the content display process by commanding the content requestor 210 to request content from, for example, a remote server such as the content server 218. The application 208 can initiate a content display process based on user input, or based on, for example, a schedule for initiating content display. In some implementations, the application 208 can initiate a content display process prior to a display of primary content, for example, immediately prior to the display of primary content, or can initiate a content display process following display of at least a portion of primary content. The application 208 can then proceed to step 304.

In some implementations, at step 304, the content requestor 210 can identify a network connection type as a primary network connection. For example, the content requestor 210 can query a network interface of the client device 202 to determine a network connection type. The network interface can include one or more applications or other executable logics for receiving data via the network 250 and for transmitting data from the client device 202 to any of the other devices connected to the network 250. Generally, the network connection type can be, for example, a primary network connection, such as a high-bandwidth Wi-Fi connection or an Ethernet-based LAN, or the network connection type can be, for example, a secondary network connection, such as a cellular or satellite connection. At step 304, the content requestor 210 can identify that the client device 202 is connected to a primary network. The content requestor 210 can then proceed to step 306.

In some implementations, at step 306, the content requestor 210 can transmit a content request to the content server 218. The request can include content request information related the display of the content. For example, the content request information can include a range of acceptable playtimes of the content, a parameter indicating whether the content may include a skip option, a parameter indicating whether the content can be auto-play content, or other parameters. In some implementations, the request can, but need not, include identifiers of media files that are pre-cached on the client device 202.

In some implementations, at step 308, the content server 218 can receive the content request via, for example, a network, such as the network 250. The request can include content request information related the display of the content. For example, the content request information can include a range of acceptable playtimes of the content, a parameter indicating whether the content may include a skip option, a parameter indicating whether the content can be auto-play content, a parameter indicating a network connection type (e.g. a parameter indicating if the client device 202 is currently connected to a primary network or a secondary network), or other parameters. The content server 218 can, responsive to receiving the request, command the content retriever 224 to retrieve data related to the request. The content server 218 can then proceed to step 310.

In some implementations, at step 310 the content retriever 224 can retrieve data related to a content request by transmitting a request to one or more remote servers, such as the content provider server 232, to identify or provide one or more media files for display. The content retriever 224 can request identifiers of media files that correspond to the content request information. For example, the content retriever 224 can request, from the content provider server 232, identifiers of media files that satisfy an acceptable playtime requirement included in the content request information. Such identifiers may later be used to identify media files already stored on the content server 218 that correspond to the identifiers. In some implementations, the content retriever 224 can request media files themselves, rather than or in addition to identifiers of items of content. This method can be used, for example, when the media files are not already stored on the content server 218, or are not readily accessible to the content server 218.

In some implementations, at step 312, the content provider server 232 can receive the media file identifier request, and can respond by transmitting a corresponding media identifier to the content server. The response transmission can include, for example, identifiers of items of content that satisfy one or more requirements included in the content request information, and/or media files that satisfy one or more requirements included in the content request information. The content retriever 224 can identify media files received from the content provider server 232, and can provide those media files or provide a location of those media files to the content selector 226.

In some implementations, at step 314 the content retriever 224 can receive a response to the request to identify or provide media files from the content provider server 232. In some implementations, the content retriever 224 can receive the response to the request to identify or provide media files from the content provider server 232 including selection criteria and corresponding monetary amounts provided by the content provider server 232 that can later be used in a selection of the identified media files by the content selector 226. The content server 218 can then proceed to step 316.

In some implementations, at step 316, the content selector 226 can select a media file for display. The content selector 226 can select content for display based on, for example, the monetary agreements and the selection criteria. The content selector 226 can select a media file for display according to a process such as the example content selection process 400 depicted in FIG. 4 and described in more detail below. The content selector can select a media file for display based on a highest monetary amount associated with selection criteria or a monetary agreement that would be satisfied by display of the media file on the client device 202. The content server 218 can then proceed to step 318.

In some implementations, at step 318 the content selector 226 can transmit content for display to the client device 202. The content selector 226 can transmit the content for display to the client device 202 including the selected media file and additional display instructions retrieved by the additional display instructions retriever 230. The content selector 226 can transmit the content for display including the media file based on an identification of the parameter indicating a primary network connection type received at step 308.

In some implementations, at step 320, the client device 202 can receive and play the media file on the display 216. The client device 202 can play the media file on the display 216 according to the additional display instructions. For example, the additional display instructions may include a statistics tracking URL and HTML data that indicates a format for a window in which the content is to be displayed. The client device 202 can play the media file on the display 216 in a window formatted according to the HTML data, and the statistics tracker 214 can cause a web browser of the client device 202 to access a statistics tracking website specified by the URL. The client device 202 can then proceed to step 322.

In some implementations, at step 322, the content requestor 210 can pre-cache the displayed media file in the media file data store 212. As discussed above, although referred to as pre-caching, the file may have been displayed already (e.g. at step 320). Accordingly, "pre-caching" may be considered as pre-cached relative to a subsequent request. The content requestor 210 can flag the pre-cached media file as a media file compatible with a secondary content display process. The content requestor 210 pre-cache the media file responsive to determining that there is sufficient space in the media file data store, or responsive to determining that less than a predetermined threshold number of media files are stored in the media file data store.

Figure 3B:
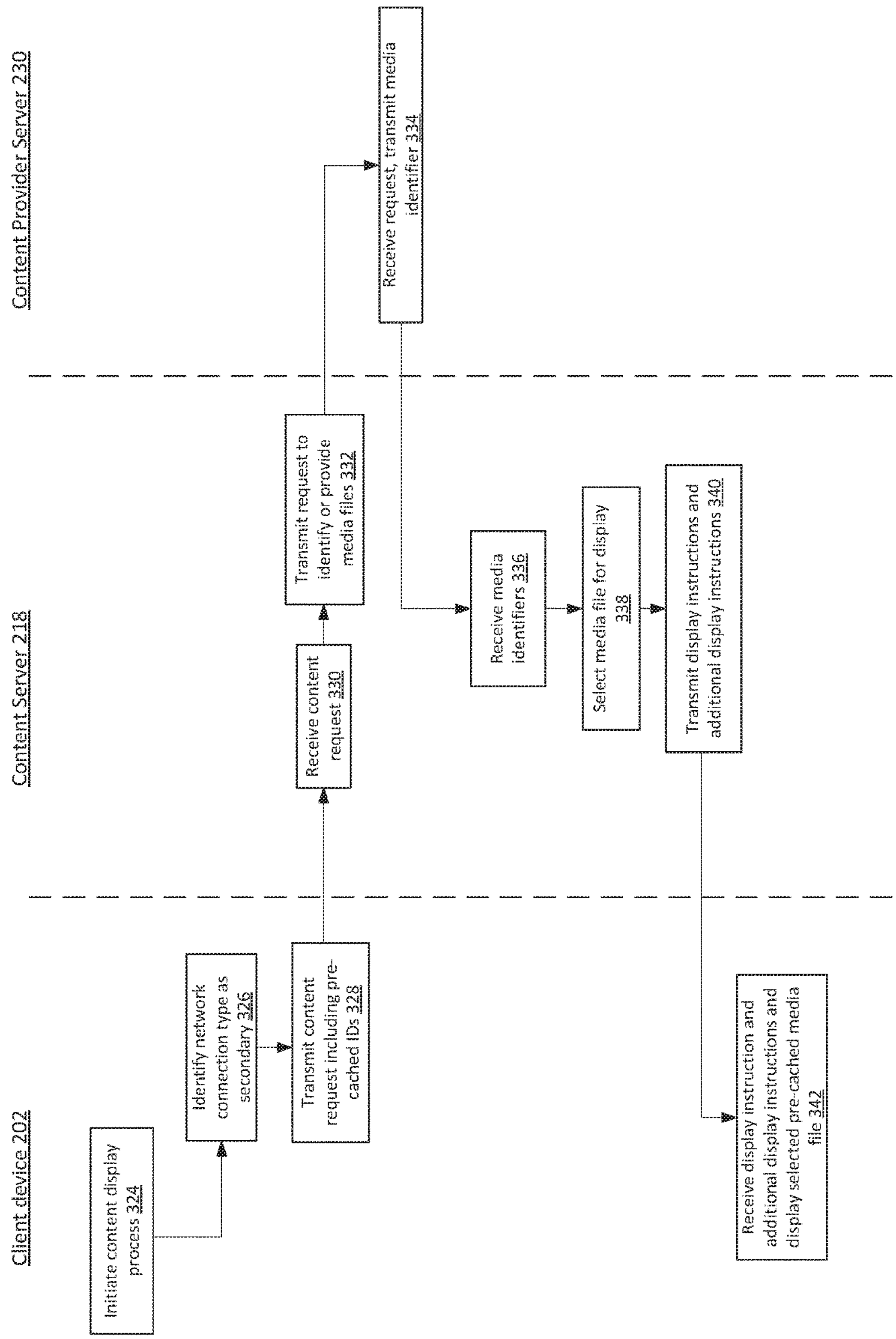
FIG. 3B is a flowchart depicting an implementation of a secondary content display process.

FIG. 3B depicts some implementations of a secondary content display process 301. As discussed above, the secondary content display process can be a process implemented by the client device 202 responsive to the content requestor 210 determining that the client device is connected to a secondary network. The secondary content display process can include steps 324-342. Generally, at step 324, the application 208 can initiate a content display process. At step 326, the content requestor 210 can identify a network connection type as a secondary network connection. At step 328, the content requestor 210 can transmit a content request to the content server 218, the request including identifiers of media files that are pre-cached on the client device 202. At step 330, the content server 218 can receive the content request. At step 332, the content retriever 224 can transmit a media file identifier request to the content provider server 236. At step 334, the content provider server 232 can receive the media file identifier request, and can respond by transmitting to the content server 218 one or more media file identifiers that correspond to the request. At step 336, the content retriever 224 can receive the one or more media file identifiers. At step 338, the content selector 226 can select a media file for display. At step 340, the content server 218 can transmit display instructions and additional display instructions to the client device 202. At step 342, the client device 202 can receive the display instructions and additional display instructions, and can display the selected pre-cached media file.

Some of the steps of the secondary display process 301 can be performed in a manner similar to some of the steps of the primary display process 300, described above. For example, the steps 324 and 330-338 can be performed similarly to steps 302 and 308-316. The below description describes the other steps of the secondary display process 301 in more detail.

In some implementations, at step 326, the content requestor 210 can identify a network connection type as a secondary network connection, such as a connection to a cellular network. For example, the content requestor 210 can query a network interface of the client device 202 to determine a network connection type. The network interface can include one or more applications or other executable logics for receiving data via the network 250 and for transmitting data from the client device 202 to any of the other devices connected to the network 250. The network interface can respond to the query with an indication that the network connection is a secondary network connection type.

In some implementations, at step 328, the content requestor 210 can transmit a content request to the content server 218. The request can include content request information related the display of the content. For example, the content request information can include a range of acceptable playtimes of the content, a parameter indicating whether the content may include a skip option, a parameter indicating whether the content can be auto-play content, or other parameters. The request can further include an identification of any pre-cached media files stored in the media file data store 212.

As discussed above, steps 330 through 338 may be similar to corresponding steps 320-348. In some implementations, at step 340, the content requestor 210 can transmit display instructions and additional display instructions. This step can be performed in a manner similar to step 318 of the primary content display process 300, but does not include transmission of a media file to the client device 202. Rather, the display instructions or the additional display instructions can include an identification of the selected pre-cached media file. This can help to reduce download requirements while the client device is connected to a secondary network.

In some implementations, at step 342, the client device can receive the display instructions and the additional display instructions, and can display the selected pre-cached media file. The client device 202 can retrieve the selected pre-cached media file from the media file data store 212 based on an identification of the pre-cached media file included in either or both of the display instructions or the additional display instructions. The client device 202 can further play the media file on the display 216 according to the additional display instructions.

Figure 4:
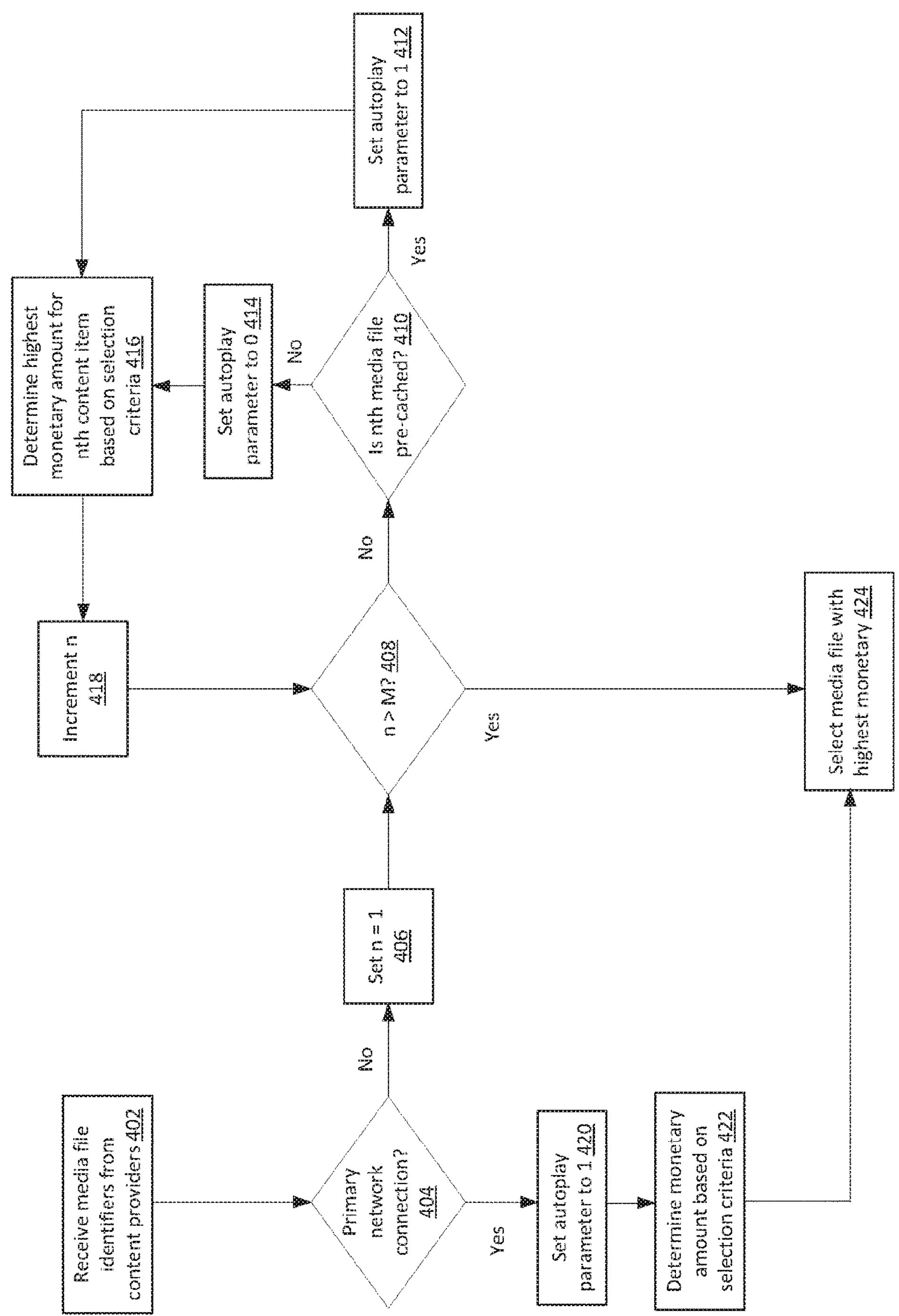
FIG. 4 is a flowchart depicting an implementation of a media file selection process.

Referring now to FIG. 4, illustrated is a flowchart depicting a media file selection process 400. The media file selection process 400 can include an auto-play protocol that determines whether a media file is permitted to be played automatically on the client device 202. In some implementations, the media file selection process 400 can be performed by the content selector 226. The media file selection process 400 can include steps 402-424. Generally, at step 402, the content selector 226 can receive media file identifiers from one or more content provider servers 232. The media file identifiers can be associated with monetary agreements that may include a monetary amount and one or more selection criteria. At step 404, the content selector 226 can determine whether the client device is connected to a primary network based on, for example, a network type parameter value included in the content request information. If the content selector 226 determines that the client device 202 is connected to a primary network, the content selector 226 can proceed to step 420, at which the content selector 226 can set an auto-play parameter to 1 for all media files. The content selector 226 can then proceed to step 422, at which the content selector 226 can determine a highest respective monetary amount for each of the media files based on selection criteria. The content selector 226 can then proceed to step 424 and select the media file with the highest monetary amount.

Returning to step 404, if the content selector 226 determines that the client device 202 is not connected to a primary network (e.g. is connected to a secondary network), the content selector 226 can proceed to step 406. At step 406, the content selector 226 can set an index n to 1, and can proceed to step 408. At step 408, the content selector 226 can determine whether the index n is greater than a number M media files to be evaluated. If the content selector 226 determines that the index n is nor greater than the number M, the content selector 226 can proceed to step 410. At step 410, the pre-cached media file matcher 228 of the content selector 226 can determine whether the nth media file is pre-cached. If the pre-cached media file matcher 228 determines that the nth media file is pre-cached, the content selector 226 can proceed to step 412 and set an auto-play parameter to 1 for the nth media file, and can then proceed to step 414. Returning to step 410, if the pre-cached media file matcher 228 determines that the nth media file is not pre-cached, the content selector 226 can proceed to step 414 and set an auto-play parameter for the nth media file to 0, and can then proceed to step 416. At step 416, the content selector 226 can determine a monetary amount for the nth content item based on the selection criteria. The content selector 226 can then proceed to step 418, at which the content selector 226 can increment the index n, and the content selector 226 can then proceed to step 408. At step 408, if the content selector 226 determines that the index n is larger than the number M, the content selector 226 can proceed to step 424 where, as discussed above, the content selector 226 can select media file with a highest monetary amount for display.

Referring now to steps 402-424 in more detail, in some implementations, at step 402, the content selector 226 can receive a set of one or more media files identifiers from one or more content provider servers 232. The content selector 226 can receive monetary agreements associated with the media file identifiers. Each of the monetary agreements can include a monetary amount and corresponding selection criteria. The content selector 226 can perform media file selection process 400 to determine which media file of the set of media files is associated with the highest monetary amount. In the following description, "receiving a monetary amount" can refer to receiving a monetary agreement that includes a monetary amount.

In some implementations, at step 404, the content selector 226 can determine whether the client device 202 is connected to a primary network. The content selector 226 can make this determination based on the content request information received from the client device 202, which can include a network type parameter that indicates what type of network the client device 202 was connected to when it requested content from the content server 218. If the content selector 226 determines that the client device 202 is connected to a primary network, the content selector 226 can proceed to step 420. If the content selector 226 determines that the client device 202 is not connected to a primary network (e.g. is connected to a secondary network), the content selector 226 can proceed to step 406.

In some implementations, at step 406, the content selector 226 can set an index n to 1. The index n can run from an initial value of 1 to a value of M, where M is a number of media files in the set of media files received by the content server 218. Generally, in steps 408-418, the content selector 226 can perform operations and analysis involving the nth media file of the set of media files. After setting the index n to an initial value of 1, the content selector 226 can proceed to step 408.

In some implementations, at step 408, the content selector 226 can compare the index value n to the total number of media files M. Comparing the index value to the total number of media files may comprise a bitwise comparison of data strings (e.g. an XOR with a result of 0 indicating the index is equal to the threshold); calculating a difference between the total number of media files of the set of media files and the index and determining if the result is negative, positive, or zero; or any other such method. This may help determine whether all M of the media files have been processed in the media file selection process 400. If the index value n is greater than or equal to M, the content selector 226 can proceed to step 424 to select a media file having a highest monetary amount. Otherwise, the content selector 226 can proceed to step 410.

In some implementations, a step 410, the pre-cached media file matcher 228 of the content selector 226 can determine whether the nth media file is pre-cached on the client device. The pre-cached media file matcher 228 can make this determination by comparing the nth media file identifier to each media file of a list of pre-cached media file identifiers received from the client device 202 as part of the content request. In some implementations, the media file identifier includes an identification string. The pre-cached media file matcher 228 can perform the comparison, for example, as a string comparison of the identification string of the nth media file and a respective identification string for each media file identifier of the list of pre-cached media file identifiers. If the pre-cached media file matcher 228 determines that the nth media file is pre-cached on the client device 202, the content selector 226 can proceed to step 412. If the pre-cached media file matcher 228 determines that the nth media file is not pre-cached on the client device 202, the content selector 226 can proceed to step 414.

In some implementations, at step 412, the content selector 226 can set an auto-play parameter value of the nth media file to 1. This can indicate that auto-play is possible for the nth media file. Because the media file is pre-cached on the client device 202, no downloading of the media file is required to display the media file on the client device 202. Thus, even under a policy wherein auto-play is disallowed for any media file that must be downloaded, so as to protect users from automatically downloading content on a secondary network connection, for example, auto-play can still be allowed for the nth media file. The auto-play parameter may be used, for example, later in the media file selection process 400 to determine whether the nth media file satisfies an auto-play criterion. After setting the auto-play parameter value for the nth media file to 1, the content selector 226 can proceed to step 416.

Returning now to step 410, in some implementations, if the pre-cached media file matcher 228 determines that the nth content item is not pre-cached, the content selector 226 can proceed to step 414. At step 414, the content selector 226 can set an auto-play parameter value for the nth media file to 0. This may indicate that auto-play is disallowed for the nth media file. This may help protect a user by preventing automatic download of a media file over a secondary network connection. The content selector 226 can then proceed to step 416.

In some implementations, at step 416, the content selector 226 can determine a highest monetary amount for the nth media file based on selection criteria. For example, the content selector 226 may have received a plurality of monetary amounts and selection criteria for at least some of the media files of the set of M media files. As discussed above, some monetary amounts can be associated with selection criteria. The content selector 226 may select only monetary amounts whose associated criteria is satisfied. For example, if a monetary amount is associated with a criterion that a corresponding media file must be displayed as an auto-play media file, the monetary amount may only be selected as a potential highest monetary amount for the nth media file if the nth media file can be displayed as an auto-play media file, which can be indicated by an auto-play parameter value for the nth media file being 1. In some implementations, the content selector 226 can consider, for the nth media file, every monetary amount received by the content selector 226 whose associated criteria are satisfied, and the content selector 226 can select the highest monetary amount of those monetary amounts as the highest monetary amount for the nth media file.

In some implementations, the content selector 226 can then proceed to step 418, where the index value n can be incremented, and the content selector 226 can proceed to step 408. At step 408, if the content selector 226 determines that the index value n is greater than the number of media files of the set of media files M, the content selector 226 can determine that all the media files have been processed, and can proceed to step 242.

Returning now to step 404, in some implementations, the content selector 226 determines that the client device 202 is connected to a primary network. The content selector 226 can then proceed to step 420.

In some implementations, at step 420, the content selector 226 can set an auto-play parameter to 1 for each media file of the setoff media files. This is in keeping with the policy described above in reference to step 412, which can disallow auto-play in certain scenarios so as to protect users from automatically downloading a media file on a secondary network connection. Because the client device 202 is connected to a primary network, there may no substantial risk of the client device downloading a media file on a secondary network connection. The content selector 226 can then proceed to step 422.

In some implementations, at step 422, the content selector 226 can determine, for each of the M media files, a highest respective monetary amount based on the monetary amounts and associated selection criteria received by the content selector 226 from the content provider servers 232. This can be performed in a process similar to that described above with respect to step 416. The content selector 226 can then proceed to step 424.

In some implementations, at step 424, the content selector 226 can select a media files having a highest "highest monetary amount"—that is, the media file whose highest monetary amount is the largest out of the set of media files. The selected media file or the selected media file identifier can then be transmitted to the client device 202 by the content server 218 for display on the display 216.

Accordingly, the systems and methods discussed herein provide implementations for reducing download requirements for display of content, potentially improving bandwidth consumption and reducing inter-device communications, improving battery life of client devices by retrieving data over more efficient and higher speed interfaces, providing better compliance with service provider policies or reducing costs (e.g. by using high bandwidth, low cost primary connections, rather than more expensive secondary connections, etc.).

In a first aspect, the present disclosure is directed to a method of reducing download requirements for display of content. The method can include transmitting, by a client device to a content server, a content request, the request including an identifier for each of one or more pre-cached media files stored on the client device, the transmission being carried out whilst the client device is connected to a first network. The method can further include receiving, by the client device from the content server, a response including instructions to display a selected one of the pre-cached media files, the response including additional display instructions related to display of the selected pre-cached media file, and displaying, by the client device, the pre-cached media file according to the additional display instructions.

In some implementations, the method of reducing download requirements for display of content can further include downloading, by the client device at a first time prior to transmitting the content request, while connected to a second network, one or more media files, and storing, by the client device, each media file as a pre-cached media file.

In some implementations, the first network is a cellular or satellite network and the second network is a Wi-Fi network or Ethernet-based LAN network.

In some implementations, storing each media file as a pre-cached file is performed responsive to the client device determining that fewer than a predetermined number of media files are pre-cached on the client device.

In some implementations, storing each media file as a pre-cached file is performed responsive to the client device determining that less than a predetermined amount of storage memory is used by pre-cached media files on the client device.

In some implementations, the request to display the selected pre-cached media files includes a request to automatically play the media file on a display.

In some implementations, the additional display instructions comprise instructions that specify a frame or window in which the media file is to be shown, and/or instructions to transmit media playback statistics to a measurement server.

In some implementations, the method of reducing download requirements for display of content can further include the instructions to transmit media playback statistics comprises instructions to transmit information identifying at least one of: a number of times the media file was displayed, a device type on which the media file was displayed, or a playback time during display of the media file at which a remainder of the display of the media file was skipped.

In a second aspect, the present disclosure is directed to a method of reducing download requirements for display of content. The method can include receiving, by a content server from a client device connected to a first network, a content request, the content request including respective identifiers of one or more media files pre-cached at the client device, requesting, by the content server from a content provider, an identification of a media file, the request including the identifiers of the one or more media files pre-cached at the client device, and receiving, by the content server from the content provider, the identification of the media file. The method can further include matching, by the content server, the identification of the media file to an identifier of one of the pre-cached media files, selecting, by the content server, the identified pre-cached media file for display, retrieving, by the content server, additional display instructions corresponding to the pre-cached media file, transmitting, by the content server to the client device, a response including instructions to display the one of the pre-cached media files according to the additional display instructions, the response including the additional display instructions.

In some implementations, the method of reducing download requirements for display of content further includes receiving, by the content server from the client device while the client device is connected to a second network, at a first time prior to receiving the content request, an initial request for a media file, and transmitting, by the content server to the client device responsive to receiving the initial request for a media file, a media file to be stored as a pre-cached media file.

In some implementations, the first network is a cellular or satellite network and the second network is a Wi-Fi network or Ethernet-based LAN network.

In some implementations, the additional display instructions comprise instructions that specify a frame or window in which the pre-cached media file is to be shown, and/or instructions to transmit media playback statistics to a measurement server.

In some implementations, the instructions to transmit the media playback statistics to the measurement server comprises instructions to transmit information identifying at least one of: a number of times the media file was displayed, a device type on which the media file was displayed, or a playback time during display of the media file at which a remainder of the display of the media file was skipped.

In some implementations, selecting, by the content server, the pre-cached media file for display further includes assigning, by the content server, respective selection weight points to each of a plurality of monetary agreements each associated with media files, at least one monetary agreement associated with the pre-cached media file, including assigning at least one selection weight point to the monetary agreement associated with the pre-cached media file based on the pre-cached media file being pre-cached at the client device, and selecting, by the content server, the monetary agreement associated with the pre-cached media file based on the monetary agreement having a highest selection weight of the plurality of monetary agreements.

In some implementations, wherein assigning at least one selection weight point to the monetary agreement associated with the pre-cached media file based on the pre-cached media file being pre-cached at the client device includes determining, by the content server, that an auto-play protocol permits the associated pre-cached media file to be displayed automatically based on the media file being pre-cached on the client device, and assigning the at least one selection weight point to the monetary agreement based on the auto-play protocol permitting the pre-cached media file to be displayed automatically.

In some implementations, retrieving, by the content server, additional display instructions corresponding to the pre-cached media file comprises generating HTML or CSS data that defines a context in which the media file is to be displayed according to a protocol stored on the content server.

In some implementations, the request to display the pre-cached media file includes a request to automatically display the media file on a display.

In a third aspect, the present disclosure is directed to a system for reducing download requirements for display of content. The system can include a client device, the client device including a processor configured to execute non-transitory processor-executable instructions, and a data store storing non-transitory processor-executable instructions which, when executed by the processor, cause the processor to download, while connected to a first network, one or more media files, and store each media file as a pre-cached media file, and initiate, while the client device is connected to a second network. The non-transitory processor-executable instructions, when executed by the processor, can further cause the processor to transmit, to a content server, a content request, the request including an identifier for each of the one or more pre-cached media files stored on the client device, the transmission being carried out whilst the client device is connected to a second network, receive, from the content server, a response including instructions to display a selected one of the pre-cached media files, the response including additional display instructions for display of the selected pre-cached media file, and display the pre-cached media file according to the additional display instructions.

In some implementations, the additional request instructions can include instructions that specify a frame or window in which the media file is to be shown, and instructions to transmit media playback statistics to a measurement server.

In some implementations, the instructions to transmit media playback statistics can include instructions to transmit information identifying at least one of: a number of times the media file was displayed, a device type on which the media file was displayed, or a playback time during display of the media file at which a remainder of the display of the media file was skipped.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products embodied on tangible media. References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The claims should not be read as limited to the described order or elements unless stated to that effect. It should be understood that various changes in form and detail may be made by one of ordinary skill in the art without departing from the spirit and scope of the appended claims. All implementations that come within the spirit and scope of the following claims and equivalents thereto are claimed.

What is claimed is:

1. A method, comprising:

determining, by a client device at a first time, that the client device is connected to a first network having a first network type;

downloading, by the client device responsive to the first network type satisfying a first network type condition, while connected to the first network, a plurality of media files;

determining, by the client device at a second time after the first time, that the client device is connected to a second network different from the first network, the second network having a second network type different from the first network type;

generating, by the client device, responsive to the second network type satisfying a second network type condition, a request for content that includes identifiers of the plurality of media files downloaded by and stored on the client device;

transmitting, by the client device to a content server, responsive to generating the request for content, the request for content including the identifiers of the plurality of media files downloaded and stored on the client device, the transmission being carried out whilst the client device is connected to the second network having the second network type;

receiving, by the client device from the content server, an identifier of a pre-cached media file downloaded by and stored on the client device, the identifier of the pre-cached media file selected by the content server based on a weight assigned to the identifier of the pre-cached media file based on (i) a presence of the identifier of the pre-cached media file in the request for content and (ii) the pre-cached media file satisfying additional content selection criteria; and displaying, by the client device, a media file of the plurality of media files downloaded by and stored on the client device that corresponds to the identifier of the pre-cached media file selected by the content server.

2. The method of claim 1, wherein the second network is a cellular network and the second first network is a Wi-Fi network.

3. The method of claim 1, wherein downloading the plurality of media files is performed responsive to the client device determining that fewer than a predetermined number of media files are pre-cached on the client device.

4. The method of claim 1, wherein downloading the plurality of media files is performed responsive to the client device determining that less than a predetermined amount of storage memory is used by pre-cached media files on the client device.

5. The method of claim 1, wherein the identifier of the pre-cached media file is received in a response message from the content server, the response message further comprising additional display instructions that cause the client device to automatically play the pre-cached media file on a display.

6. The method of claim 5, wherein the additional display instructions comprise instructions that specify a frame or window in which the pre-cached media file is to be shown, and instructions to transmit media playback statistics to a measurement server.

7. The method of claim 6, wherein the instructions to transmit media playback statistics comprises instructions to transmit information identifying at least one of: a number of times the pre-cached media file was displayed, a device type on which the pre-cached media file was displayed, or a playback time during display of the pre-cached media file at which a remainder of the display of the pre-cached media file was skipped.

8. A method, comprising:

receiving, by a content server from a client device connected to a first network, responsive to the client device determining that the client device is connected to the first network having a first network type that satisfies a network type condition, a request for content including a first plurality of candidate identifiers of pre-cached media files stored on the client device;

transmitting, by the content server to a content provider, a request for candidate identifiers of candidate media files based on the request for content;

receiving, by the content server from the content provider responsive to the request for the candidate identifiers, a second plurality of candidate identifiers identifying media files;

identifying, by the content server, a matching identifier included in both the first plurality of candidate identifiers and the second plurality of candidate identifiers;

assigning, by the content server, a first weight to the matching identifier based on the matching identifier being included in both the first plurality of candidate identifiers and the second plurality of candidate identifiers, and based on a pre-cached media file corresponding to the matching identifier satisfying additional content selection criteria;

selecting, by the content server, based on the first network type satisfying the network type condition, from the second plurality of candidate identifiers, the matching identifier based on the first weight; and transmitting, by the content server to the client device, a response comprising the matching identifier to cause the client device to display a media file identified by the matching identifier.

9. The method of claim 8, further comprising:

receiving, by the content server from the client device while the client device is connected to a second network different from the first network, at a first time prior to receiving the request for content, an initial request for an initial media file; and transmitting, by the content server to the client device responsive to receiving the initial request for the initial media file, the initial media file to be stored as a pre-cached media file.

10. The method of claim 9, wherein the first network is a cellular network and the second network is a Wi-Fi network.

11. The method of claim 8, wherein the response further comprises additional display instructions that specify a frame or window in which the media file identified by the matching identifier is to be shown, and instructions to transmit media playback statistics to a measurement server.

12. The method of claim 11, wherein the instructions to transmit the media playback statistics to the measurement server comprises instructions to transmit information identifying at least one of: a number of times the media file was displayed, a device type on which the media file was displayed, or a playback time during display of the media file at which a remainder of the display of the media file was skipped.

13. The method of claim 8, wherein selecting, by the content server, the matching identifier further comprises:

assigning, by the content server, respective selection weight points to each of a plurality of monetary agreements each associated with media files, at least one monetary agreement associated with the media file identified by the matching identifier, including assigning at least one selection weight point to the monetary agreement associated with the media file identified by the matching identifier based on the media file identified by the matching identifier being pre-cached at the client device; and selecting, by the content server, the monetary agreement associated with the media file identified by the matching identifier based on the monetary agreement having a highest selection weight of the plurality of monetary agreements.

14. The method of claim 13, wherein assigning the at least one selection weight point to the monetary agreement associated with the media file based on the media file identified by the matching identifier being pre-cached at the client device comprises:

determining, by the content server, that an auto-play protocol permits the media file to be displayed automatically; and assigning the at least one selection weight point to the monetary agreement based on the auto-play protocol permitting the media file identified by the matching identifier to be displayed automatically.

15. The method of claim 8, further comprising:

retrieving, by the content server, additional display instructions corresponding to the media file identified by the matching identifier; and generating, by the content server, HTML, or CSS data in the additional display instructions that defines a context in which the media file is to be displayed according to a protocol stored on the content server, wherein the response further comprises the additional display instructions.

16. The method of claim 15, wherein the additional display instructions comprise instructions to automatically display selected pre-cached the media file on a display.

17. A system, comprising:

a processor of a client device configured to execute non-transitory processor-executable instructions; and a data store storing non-transitory processor-executable instructions which, when executed by the processor, cause the processor to:

determine that the client device is connected, at a first time, to a first network having a first network type;

download, responsive to the first network type satisfying a first network type condition, while connected to the first network, a plurality of media files;

store the plurality of media files as a plurality of pre-cached media files;

determine, at a second time after the first time, that the client device is connected to a second network different from the first network, the second network having a second network type different from the first network type;

generate, responsive to the second network type satisfying a network type condition, a request for content that includes identifiers of the plurality of pre-cached media files stored on the client device;

transmit, to a content server, responsive to generating the request for content, the request for content including the identifiers of the plurality of pre-cached media files stored on the client device, the transmission being carried out whilst the client device is connected to the second network having the second network type;

receive, from the content server, an identifier of a pre-cached media file of the plurality of pre-cached media files, the identifier of the pre-cached media file selected by the content server based on a weight assigned to the identifier of the pre-cached media file based on (i) a presence of the identifier of the pre-cached media file in the request for content and (ii) the pre-cached media file satisfying additional content selection criteria; and display the pre-cached media file of the plurality of pre-cached media files that corresponds to the identifier of the pre-cached media file selected by the content server.

18. The system of claim 17, wherein the identifier of the pre-cached media file is received in a response message from the content server, the response message further comprising additional display instructions that specify a frame or window in which the pre-cached media file selected by the content server is to be shown, and instructions to transmit media playback statistics to a measurement server.

19. The system of claim 18, wherein the instructions to transmit media playback statistics comprises instructions to transmit information identifying at least one of: a number of times the pre-cached media file selected by the content server was displayed, a device type on which the pre-cached media file selected by the content server was displayed, or a playback time during display of the pre-cached media file selected by the content server at which a remainder of the display of the pre-cached media file was skipped.

* * * * *